United States Patent Office 3,351,678
Patented Nov. 7, 1967

3,351,678
POLYOLEFINS STABILIZED WITH A COMBINATION OF PHENOLS AND EPISULFIDE POLYMERS
Lane F. McBurney, Newark, Del., assignor to Hercules Incorporated, a corporation of Delaware
No Drawing. Filed Aug. 12, 1964, Ser. No. 389,219
5 Claims. (Cl. 260—897)

ABSTRACT OF THE DISCLOSURE

A water-extraction resistant stabilizer system for polypropylene and higher polyolefins comprises the combination of a phenolic antioxidant and certain episulfide polymers having an RSV greater than about 0.8, and particularly such polymers as poly(propylene sulfide), poly(cis-2-butene episulfide) or the polymer of an episulfide of a $C_{16-18}$ 1-monoolefin mixture.

---

The present invention relates to polyolefin compositions and, more particularly, to the stabilization of stereoregular polymers of propylene and higher α-olefins against oxidative degradation.

Highly crystalline, high molecular weight stereoregular polymers of propylene and higher α-olefins are well known and have many established uses. However, one of the deficiencies of such polymers, which must be overcome to enable their use in many applications, is poor stability during exposure to oxygen, particularly in the presence of heat.

It is known that stereoregular polymers of propylene and higher α-olefins can be stabilized against adverse effects of heat by incorporating in such polymers a small amount of a phenolic antioxidant. It is also known that various sulfur compounds act as stabilizers for these polyolefins. Although these phenolic and sulfur compounds protect the polyolefins from degradation due to oxygen and heat, they have not proved entirely satisfactory for many end uses due to the ease with which they are water-extracted from polymers containing them.

Now, in accordance with the present invention, it has been found that stereoregular polyolefins which contain a phenolic antioxidant can be protected against deterioration due to oxygen and heat and that the protection is retained after extraction with water provided such polymers also contain a small amount of a polymer of an episulfide containing 3 to 30 carbon atoms. This finding was indeed unexpected since neither the phenolic antioxidant nor the polymer of the episulfide alone is an effective extraction resistant oxidation stabilizer for polyolefins.

Accordingly, the present invention is directed to stereoregular polymers of propylene and higher α-olefins containing as a stabilizer therefor a small amount of a polymer of an episulfide containing 3 to 30 carbon atoms and having the formula

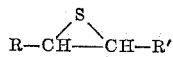

where R is an alkyl radical containing 1 to 28 carbon atoms and R' is selected from the group consisting of hydrogen and methyl, said polymer of an episulfide having a reduced specific viscosity greater than about 0.8 and a small amount of a phenolic antioxidant. The term "reduced specific viscosity" (also referred to as "RSV") indicates the molecular weight of the polymer and is defined as $\eta_{sp}/C$, which is the specific viscosity divided by concentration of a 0.1% weight/volume solution of the polymer in a given solvent. Unless otherwise specified, the RSV of the polymer of the episulfide was measured in chloroform at 25° C. and the RSV of polypropylene was measured in decahydronaphthalene at 135° C.

Although any phenolic antioxidant known to be an oxidation and heat stabilizer for polyolefins can be used in combination with the polymer of the episulfide in the present invention, the invention is particularly useful with polysubstituted phenols, poly(alkylphenol) substituted hydrocarbons, hydroxyphenyl polyalkylchromans, adducts of an alkylphenol and a cyclic terpene, thiobis (alkylphenol)s, and hydroxyphenoxy substituted triazines. The A-stage para-tertiary alkylphenolformaldehyde resins such as are described in U.S. Patent 2,968,641 are also suitable.

Any stereoregular polymer of an α-olefin having at least 3 carbon atoms can be stabilized by means of the invention. The invention is particularly useful, however, in stabilizing stereoregular polymers of olefins having from 3 to 6 carbon atoms, including, for instance, polypropylene, poly(butene-1), poly(pentene-1), poly(3-methylbutene-1), and poly(4-methylpentene-1).

The phenolic antioxidants used to produce the compositions of the invention are well known. The polysubstituted phenols that can be used are either di- or trisubstituted phenols. Particularly preferred are the 2,4,6-trialkylphenols described in U.S. Patent 2,581,907 to Smith, Jr., et al., the 2-aralkyl-4,6-dialkyl substituted phenols described in U.S. Patent 2,967,853 to Spacht, and the mono-, di-, and tri(dialkyl hydroxybenzyl)phenols described in U.S. 3,053,803 to Jaffe, Rocklin, and Van Winkle. Inclusive of the trialkylphenols are:

2,4-dimethyl-6-tert-butylphenol
2,4-dimethyl-6-(alpha,alpha,gamma,gamma-tetramethylbutyl)phenol
2,6-di-tert-butyl-4-methylphenol
2-methyl-4,6-di-tert-butylphenol
2,6-di-tert-butyl-4-sec-butylphenol
2,4,6-tri-tert-butylphenol
2,4,6-triethylphenol
2,4,6-tri-n-propylphenol
2,4,6-triisopropylphenol
2,6-di-tert-octyl-4-propylphenol
2,6-di-tert-butyl-4-ethylphenol
2,4-dicyclohexyl-6-methylphenol
2-isopropyl-4-methyl-6-tert-butylphenol
2,4-dimethyl-6-tert-amylphenol
2,4-di-tert-amyl-6-methylphenol
2,6-di-tert-butyl-4-isopropylphenol
2,6-di-tert-amyl-4-methylphenol
2,6-di-tert-amyl-4-isopropylphenol
2,4-diisopropyl-6-tert-butylphenol
2,4-diisopropyl-6-sec-hexylphenol
2-alpha-phenylethyl-4-methyl-6-tert-butylphenol, and
2-alpha-phenylethyl-4-methyl-6-tert-octylphenol.

The preferred compounds of this class are those which have primary or secondary aralkyl groups or secondary or tertiary alkyl groups at the 2- and 6-position and a normal alkyl group at the 4-position, a representative of this class being 2,6-di-tert-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms.

The preferred aralkyl dialkyl substituted phenols are those which have a primary aralkyl radical, a secondary aralkyl radical, or a tertiary alkyl radical having 4 to 12 carbons ortho to a hydroxyl group. Particularly suitable are 2-alphaphenylethyl-4-methyl-6-tert-butylphenol and 2-alphaphenylethyl-4-methyl-6-tert-octylphenol. Particularly preferred mono-, di-, and tri(dialkyl hydroxybenzyl)phenols include:

p-(3,5-di-tert-butyl-4-hydroxybenzyl)phenol
p-(3,5-diisopropyl-4-hydroxybenzyl)phenol
o-(3-methyl-5-isopropyl-4-hydroxybenzyl)phenol
o-(3-butyl-5-tert-amyl-4-hydroxybnezyl)phenol
o-(3,5-di-tert-amyl-4-hydroxybenzyl)phenol
2,6-di(3,5-di-tert-butyl-4-hydroxybenzyl)phenol
2,6-di(3,5-di-tert-butyl-4-hydroxybenzyl)-4-methylphenol
2,6-di(3-tert-butyl-5-methyl-2-hydroxybenzyl)-4-methylphenol
2,6-di(3-methyl-5-tert-amyl-4-hydroxybenzyl)phenol
2,6-di(3,5-diisopropyl-4-hydroxybenzyl)phenol
2,6-di(3,5-di-tert-hexyl-4-hydroxybenzyl)phenol
2,4-di(3,5-diisopropyl-4-hydroxybenzyl)-6-tert-butylphenol
2,4-di(3,5-di-tert-amyl-4-hydroxybenzyl)phenol
2,4-di(3-isopropyl-5-tert-butyl-4-hydroxybenzyl)phenol
2,4-di(3,5-di-tert-butyl-4-hydroxybenzyl)phenol
2,4,6-tri(3,5-di-tert-butyl-4-hydroxybenzyl)phenol
2,4,6-tri(3-methyl-5-tert-butyl-4-hydroxybenzyl)phenol
2,4,6-tri(3,5-diisopropyl-4-hydroxybenzyl)phenol, and
2,4,6-tri(3-isopropyl-5-tert-octyl-4-hydroxybenzyl)-3-methylphenol.

The second class of phenolic antioxidants, the poly (alkylphenol) substituted hydrocarbons, that can be used are either bis, tris, or tetrakis phenols and preferably are alkylidene - bis(alkylphenol)s, α,ω - bis - alkylidene - bis (alkyl - phenol)s, cycloalkylidene - bis(alkylphenol)s, benzylidene - bis(alkylphenol)s, and bis or tris(dialkyl hydroxybenzyl) alkyl benzenes. The alkylidene - bis (alkylphenol)s are characterized by the general formula

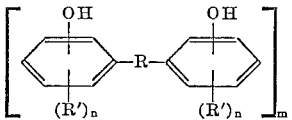

wherein R is an alkylidene radical of 1 to 5 carbon atoms and wherein R' is an alkyl group of 1 to 12 carbon atoms and n is an integer from 1 to 3 and m is an integer from 1 to 2. When more than one R' substituent is present on a phenyl group, each R' can be the same or different. Exemplary of the alkylidene - bis(alkylphenol)s that may be used are 2,2'-methylene-bis(5-isopropyphenol)
2,2'-methylene-bis(4-methyl-6-isopropylphenol)
2,2'-methylene-bis(4-methyl-6-tert-butylphenol)
2,2'-methylene-bis(4-tert-butyl-6-methylphenol)
2,2'-methylene-bis(4,6-di-tert-butylphenol)
2,2'-methylene-bis(4-nonylphenol)
2,2'-methylene-bis[4-methyl-6-(1-methyl-cyclohexyl)phenol]
2,2'-methylene-bis(4-decylphenol)
4,4'-methylene-bis(5-methyl-2-tert-butylphenol)
4,4'-methylene-bis[5-methyl-2-(1-methylcyclohexyl)phenol]
4,4'-methylene-bis(2,6-di-tert-butylphenol)
4,4'-methylene-bis(2-methyl-6-tert-butylphenol)
2,2'-isopropylidene-bis(5-methylphenol)
2,2'-ethylidene-bis(4-methyl-6-tert-butylphenol)
2,2'-ethylidene-bis(4,6-di-tert-butylphenol)
2,2'-ethylidene-bis(4-octylphenol)
2,2'-ethylidene-bis(4-nonylphenol)
2,2'-isopropylidene-bis(4-methyl-6-isopropylphenol)
2,2'-isopropylidene-bis(4-isopropylphenol)
2,2'-isopropylidene-bis(4-isopropyl-6-methylphenol)
2,2'-isopropylidene-bis(4-methyl-6-tert-butylphenol)
2,2'-isopropylidene-bis(4-octylphenol)
2,2'-isopropylidene-bis(4-nonylphenol)
2,2'-isopropylidene-bis(4-decylphenol)
2,2'-n-butylidene-bis(4-methyl-6-tert-butylphenol)
2,2'-isobutylidene-bis(4-methyl-6-tert-butylphenol)
2,2'-isobutylidene-bis(4-nonylphenol)
4,4'-n-butylidene-bis(2-tert-butyl-5-methylphenol)
and the corresponding α,ω - bis(alkylidene) - bis(alkylphenol)s.

Also suitable are the cycloalkylidene bis(alkylphenol)s, the benzylidene - bis(alkylphenol)s, and the bis or tris (dialkyl hydroxybenzyl)alkyl benzenes. Exemplary of these phenols are 4,4'-cyclohexylidene-bis(2-tert-butylphenol)
4,4'-benzylidene-bis(2-tert-butylphenol)
4,4'-(4-tert-butyl-cyclohexylidene)-bis(2-tert-butylphenol)
4,4'-cyclopentylidene-bis(2-tert-butylphenol)
4,4'-(3,5-dimethylbenzylidene)-bis(2-tert-butylphenol)
1,3,5-trimethyl-2,4,6-tris(3,5-di-tert-butyl-4-hydroxybenzyl)benzene
and the like.

The hydroxyphenyl polyalkylchromans are the 2(or 4)-(2' - hydroxyphenyl)chromans which have one of the following general formulae:

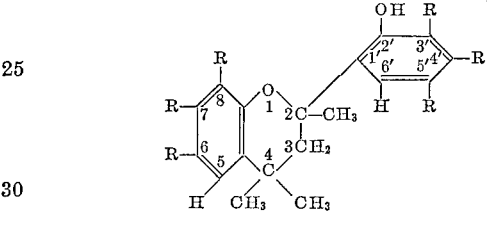

or

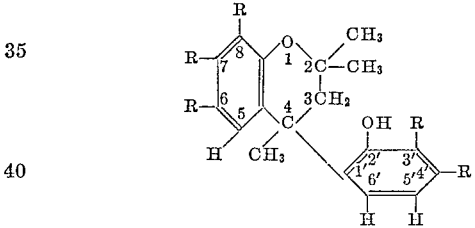

where each R may be hydrogen or alkyl, but at least one R in each of the aromatic rings is alkyl. These compounds may also be named as benzopyrans. Thus, the 2(2' - hydroxyphenyl)chromans may be named as 2,3 - dihydro-2(2' - hydroxyphenyl) - 1,4 - benzopyrans or 3,4 - dihydro - 2(2' - hydroxyphenyl) - 1,2 - benzopyrans and the 4(2' - hydroxyphenyl)chromans may be named as 2,3 - dihydro - 4(2' - hydroxyphenyl) - 1,4 - benzopyrans or 3,4 - dihydro - 4(2' - hydroxyphenyl) - 1,2-benzopyrans. The 2(2' - hydroxyphenyl)chromans are also sometimes named as flavans, i.e., 2' - hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or4) - (2' - hydroxyphenyl)chromans are 2(2'-hydroxyphenyl)-2,4,4,5',6-pentamethylchroman
4(2'-hydroxyphenyl)-2,2,4,5',6-pentamethylchroman
2(2'-hydroxyphenyl)-5',6-diisopropyl-2,4,4-trimethylchroman
2(2'-hydroxyphenyl)-5',6-diisopropyl-2,4,4,3',8-pentamethylchroman
2(2'-hydroxyphenyl)-5',6-di-tert-butyl-2,4,4-trimethylchroman
4(2'-hydroxyphenyl)-5',6-di-tert-butyl-2,2,4-trimethylchroman
2(2'-hydroxyphenyl)-5',6-dioctyl-2,4,4-trimethylchroman 2(2'-hydroxyphenyl)-5'-6-dinonyl-2,4,4-trimethylchroman 4(2'-hydroxyphenyl)-5',6-dinonyl-2,2,4-trimethylchroman 2(2'-hydroxyphenyl)-5',6-didecyl-2,4,4-trimethylchroman, etc.

The terpene—phenol adducts that are used in accordance with the invention are known materials that have been described frequently in the prior art. Generically defined they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α - pinene, α - terpinene, terpinolene, 2 - menthene, 3 - menthene, dihydroterpinolene, dihydrodipentene, camphene, $\Delta^3$ - carene, β - pinene, and the like. Suitable phenols, in addition to phenol itself, include the various isomeric cresols, 2,4 - xylenol and other isomeric xylenols, p - sec - butylphenol, p - isopropylphenol, o - isopropylphenol, m - isopropylphenol, o,o' - diisopropylphenol, o,o' - di - tert - butylphenol, o-amylphenol, o - nonylphenol, and similar compounds.

The two reactants can be condensed in varying ratios. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience, if so desired. Normally, the reaction will go to substantial completion in from 1½ to 5½ hours. Upon termination of the reaction, unconsumed reactants and volatile byproducts can be removed by distillation at reduced pressure since the adducts themselves are high boiling materials.

The acid catalyst can be any of those acids or acidic compounds that are useful catalysts in condensation reactions generally. These include mineral acis such as sulfuric acid, organic acids such as p-toluene sulfonic acid, boron trifluoride and its derivatives, as, for instance, complexes of boron trifluoride and an ether, e.g., boron trifluoride—ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The thiobisphenols that can be used in accordance with the invention are well-known materials and suitably include such compounds as 2,2'-thiobis(4-methyl-6-tert-butylphenol), 4,4'-thiobis(3-methyl-6 - tert-butylphenol), 4,4'-thiobis(5-methyl-2-tert - butylphenol), 4,4' - thiobis(2,6-di-tert-butylphenol), 4,4'-thiobis(2 - methyl - 6 - isopropylphenol), 4,4'-thiobis(2-ethyl-6-sec - butylphenol), 4,4' - thiobis(2,6 - diisopropylphenol), 4,4' - thiobis(2-methyl-6-tert-butylphenol), 4,4'-thiobis(2-n - butoxy - 6-tert-butylphenol), 4,4'-thiobis(2-methoxy - 6 - sec - butylphenol), 4,4'-dithiobis(2-n-propyl-6-tert - butylphenol), 4,4'-trithiobis(2-methyl-6-tert-butylphenol), and the like.

The hydroxyphenoxy substituted triazines which can be used to produce the compositions of the invention are also well known. Particularly preferred are the hydroxyphenoxy triazines described in Belgian Patent 610,994. Inclusive of such compounds are the mono-, di-, or tri(hydroxyphenoxy)-1,3,5-triazines, and particularly 4,6-di(4-hydroxy - 3,5 - di - tert - butylphenoxy) - 2 - S - decyl-1,3,5-triazine, and the like.

In accordance with the invention, the polymers of the episulfides that are used for the stabilization of polyolefins are polymers of an episulfide containing 3 to 30 carbon atoms and having the formula

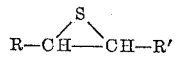

where R is an alkyl radical containing 1 to 28 carbon atoms and R' is selected from the group consisting of hydrogen and methyl, and are either amorphous or crystalline polymers or mixtures thereof having an RSV greater than about 0.8 and preferably greater than about 1.0. Suitable alkyl radicals that R can comprise include, among others, methyl, ethyl, propyl, isopropyl, n-butyl, isobutyl, tert-butyl, amyl, isoamyl, hexyl, isohexyl, 2-methyl pentyl, octyl, 2-ethyl hexyl, nonyl, decyl, lauryl, pentadecyl, cetyl, stearyl, octadecyl, eicosyl, tetracosyl, heptacosyl, and the like.

A convenient method of preparing the amorphous polymers of episulfides comprises reacting the corresponding polyepoxide with a sulfur-releasing agent such as, for instance, thiourea or a thiocyanate such as ammonium, potassium, or sodium thiocyanate in the manner described in French Patent 797,621; Chemical Abstracts 30, p. 7122; Organic Synthesis 32, p. 39; and Journal of American Chemical Society 75, p. 4959.

Amorphous polymers of episulfides of low molecular weight can also be readily prepared by polymerizing the monomeric episulfide in the presence of trialkylaluminum catalysts, preferably with triisobutylaluminum at room or elevated temperature for several hours.

Amorphous polymers of episulfides can also be produced using as the catalyst an organozinc compound which has been reacted with from about 0.2 to about 1.2 moles of water per mole of zinc. A typical catalyst preparation is carried out by reacting a solution of the organozinc compound, as, for example, diethyl zinc, in n-heptane with 0.9 mole of water per mole of zinc and agitating the mixture at 30° C. for 16 to 20 hours. The polymerization is typically carried out by injecting the catalyst solution so prepared into a solution of the episulfide in an inert diluent and agitating the mixture at room temperature or elevated temperatures under a nitrogen atmosphere for several hours. Isolation of the polymer will depend on the solubility of the polymer in the reaction diluent, etc.

Amorphous and/or crystalline polymers of episulfides can be prepared by polymerizing the corresponding episulfide using as the catalyst a halogen-free organomagnesium compound that has been reacted with at least one polyreactive compound, i.e., with any compound, organic or inorganic, which has at least 2 sites for reaction with the organo compound. Thus, any compound which has at least 2 groups or sites to react with organomagnesium compounds to form an O—Mg, S—Mg, N—Mg, P—Mg, C—Mg, or the like bond can be used. Such polyreactive compounds are compounds containing at least 2 active hydrogens; compounds containing 1 active hydrogen and 1 of the groups selected from oxygen doubly bonded to carbon (C=O), oxygen doubly bonded to nitrogen (N=O), oxygen doubly bonded to sulfur (S=O), oxygen doubly bonded to phosphorus (P=O), sulfur doubly bonded to carbon (C=S), sulfur doubly bonded to phosphorus (P=S), nitrogen doubly bonded to nitrogen (N=N), and nitrogen triply bonded to carbon (C≡N); compounds containing no active hydrogen and at least 2 groups selected from C=O, N=O, S=O, P=O, C=S, P=S, C=N, and N=S; and such polyreactive compounds as carbon monoxide and nitrogen oxide. Exemplary of compounds containing at least 2 active hydrogens that can be used as the polyreactive compounds for reaction with the organomagnesium compound to form the catalyst are water, alkylene glycols and cycloaliphatic polyols, polyhydric phenols, ammonia, amines, hydroxylamine, aminoalcohols, hydrazine, amides, hydrogen sulfide, dimercaptans, sulfones, sulfoxides, acids, ketones, esters, nitro or nitroso alkanes, nitriles, isocyanides, the hydrate of formaldehyde (HNS)4, and the like.

The amount of the polymer of the episulfide and the phenolic antioxidant incorporated in the stereoregular polyolefin can be varied from a very small stabilizing amount up to several percent. More specifically, beneficial results are normally obtained when the polymer of the episulfide and the phenolic antioxidant are each employed in an amount from about 0.01 to about 5% by weight of the polyolefin. These stabilizers can be admixed with the polyolefin by any of the usual procedures for incorporating a stabilizer in a solid material. A simple method is to dissolve the stabilizers in a low boiling solvent such as benzene and, after thoroughly mixing the solution with the polymer in flake or other such form, evaporating the solvent; or they can be incorporated by various means of mechanical mixing, etc.

In addition to the polymer of the episulfide and the phenolic antioxidant, there can also be present stabilizers such as ultraviolet light absorbers, antacids such as calcium soaps, or other antioxidants. Other materials can also be incorporated in the polymer, as, for example, pigments, dyes, fillers, etc.

The stabilized polymers of the present invention have utility in the normal uses for which plastics are employed and are particularly useful for film and fiber.

The following examples will illustrate the degree of stability that is obtained when a polyolefin is stabilized in accordance with this invention. All parts and percentages are by weight unless otherwise indicated.

The poly(propylene sulfide) having an RSV of 0.12 used in the examples was prepared by polymerizing 10 parts propylene sulfide at 30° C. for 19 hours using 4 millimoles (based on the aluminum) of a 0.88 molar solution of triisobutylaluminum in n-heptane. The reaction was shortstopped with alcohol, the reaction mixture diluted with toluene, and the reaction mixture washed twice with 3% aqueous hydrogen chloride and then with water until neutral. The product was soluble in the solvent and, after stabilization by adding 0.1% phenyl-β-naphthylamine by weight of the polymer (based on 100% conversion), it was recovered by evaporation and dried for 16 hours at 80° C. in vacuo. The recovered polymer was an amorphous, viscous mass.

The poly(propylene sulfide) having an RSV of 0.64 was prepared by polymerizing 10 parts propylene sulfide at 25° C. for 19 hours using 4 millimoles (based on the aluminum) of a catalyst solution comprising the reaction product of 1 mole triisobutylaluminum and 0.5 mole water prepared at 0.5 molar concentration in 50:50 diethyl ether:n-heptane. The reaction was then shortstopped with alcohol. Four volumes of n-heptane and 1 volume of ether were added to the reaction mass and this mixture was washed twice with a 3% aqueous solution of hydrogen chloride, washed neutral with water, and then the insoluble polymer was collected. The polymer was washed twice with ether and once with ether containing 0.1% of 4,4'-thiobis(6-tert-butyl-m-cresol). The polymer was then dried for 18 hours at 80° C. in vacuo. The isolated polymer was an amorphous, viscous, tacky mass.

The poly(propylene sulfide) having an RSV of 1.5 was prepared by polymerizing 10 parts propylene sulfide at 25° C. for 19 hours using 4.9 millimoles (based on the zinc) of a catalyst solution comprising the reaction product of 1 mole diethyl zinc and 0.9 mole water prepared at 0.5 molar concentration in 70:30 diethyl ether:n-heptane. The polymerization was shortstopped by adding 2 parts of anhydrous ethanol. The reaction mixture was dispersed in ether and was washed twice with 3% aqueous hydrogen chloride and washed neutral with water. The ether-insoluble product was collected, washed twice with ether and once with 0.01% 4,4'-thiobis(6-tert-butyl-m-cresol) in ether, after which it was dried for 16 hours at 80° C. under vacuum. The isolated polymer was a snappy rubber and was shown to be amorphous by X-ray.

The poly(propylene sulfide) having an RSV of 3.4 was prepared by polymerizing 50 parts propylene sulfide in 242 parts of anhydrous toluene at 30° C. using 0.60 part of diethyl zinc which had been reacted with 0.9 mole of water and prepared at 0.5 molar concentration in 70:30 diethyl ether:n-heptane. After 19 hours the polymerization was shortstopped by adding 20 parts anhydrous ethanol. The reaction mixture was diluted with toluene, and the reaction mixture was washed at room temperature with a 3% aqueous solution of hydrogen chloride (stirred for 1 hour) and then washed neutral with water. The product was soluble in the solvent, and, after stabilization by adding 0.1% phenyl-β-naphthylamine, it was recovered by evaporation and dried for 16 hours at 80° C. under vacuum. The polymer was obtained in a 100% conversion and was a tough rubber.

The poly(propylene sulfide) having an RSV of 5.0 was prepared by polymerizing 10 parts propylene sulfide in 42 parts of toluene at 30° C. for 19 hours using 1.0 millimole (based on the zinc) of a catalyst solution comprising the reaction product of 0.5 mole diethyl zinc and 0.9 mole water prepared at 0.5 molar concentration in 70:30 diethyl ether:n-heptane, one-half the amount of catalyst being introduced initially and the remainder after 2 hours. The polymerization was shortstopped, and 26 parts of toluene containing 0.04 part of the reaction product of 1 mole of crotonaldehyde and 3 moles of 3-methyl-6-tert-butylphenol (also hereinafter referred to as BC-C-RP) was added. Then, while stirring vigorously, 29 parts of methanol containing 0.1% BC-C-RP was added slowly over 15 minutes. The precipitate was collected, washed twice with 29 parts of methanol containing 0.1% BC-C-RP and then dried for 16 hours at 80° C. under vacuum. The tough, rubbery polymer which was obtained in 98% conversion analyzed 42.8% sulfur (theory, 43.2%) and contained 0.07% BC-C-RP.

The polymer of an episulfide of a 1-olefin containing 16 to 18 carbons was prepared by polymerizing 10 parts of the episulfide of a $C_{16}$-$C_{18}$ straight chain 1-olefin mixture in 41 parts toluene under nitrogen at 30° C. using a total of 8 millimoles (based on the zinc) of a catalyst solution comprising the reaction product of 1 mole of diethyl zinc and 0.9 mole water which was prepared at 0.5 molar concentration in 70:30 diethyl ether:n-heptane, 1 millimole of the catalyst being added initially, 1 millimole after 19 hours, 2 millimoles after 26 hours, and 4 millimoles after 43 hours. After 48 hours, the polymerization was shortstopped with alcohol. The reaction medium was diluted with toluene, stirred twice with 3% aqueous hydrogen chloride, washed neutral with water, and then precipitated with 5 volumes of methanol. The methanol-insoluble polymer was collected, washed once with methanol and once with 0.2% 4,4'-thiobis(6-tert-butyl-m-cresol) in methanol, and then dried for 16 hours at 80° C. under vacuum. The isolated polymer was obtained in 64% conversion and was a tacky rubber having an RSV of 2.2.

The poly(cis-2-butene episulfied) having an RSV of 2.6 was prepared by polymerizing 2.5 parts cis-2-butene episulfide at −78° C. for 19 hours using 1 millimole (based on the aluminum) of a catalyst solution comprising the reaction product of 1 mole of triisobutylaluminum and 0.5 mole water prepared at 0.5 molar concentration in n-heptane. The reaction was shortstopped with alcohol, the reaction mixture diluted with toluene, and the reaction washed twice with 3% aqueous hydrogen chloride. The insoluble product was separated off. The soluble polymer was precipitated from the solution with 5 volumes of methanol, and the precipitated polymer was collected. The polymer was washed once with methanol and once with a 0.2% 4,4'-thiobis(6-tert-butyl-m-cresol) and then dried for 18 hours at 80° C. in vacuo. The isolated polymer was obtained in 82% conversion and was a white, highly crystalline polymer soluble in benzene and having a melting point of about 104° C.

Examples 1–15

Several compositions were prepared by blending 100 parts of stereoregular polypropylene having a birefringent melting point of about 168° C., an RSV of 3.6, and containing 0.4% calcium stearate as an antacid with 0.5 part of various poly(propylene sulfide)s having RSV's ranging from 0.12 to 5 with and without 0.5 part of the reaction product of 2 moles of nonylphenol and 1 mole of acetone, the reaction product, also referred to as NP-A-RP, comprising a mixture of isopropylidene-bis (nonylphenol) and 2(2'-hydroxyphenyl)-2,4,4-trimethyl-5',6-dinonylchroman. Each composition was compression molded into 25-mil sheets at a pressure of 1500 p.s.i. using a cycle of 215° C./15 minutes and then cooled under pressure. The sheets were cut into 4" x ⅔" strips and the strips evaluated for embrittlement by immersing in boiling distilled water for 7 days, drying, and then exposing in a 140° C. circulating air oven until the first visual sign of degradation was observed. For the sake of comparison, compositions were also prepared and evaluated as above with the exception that no poly(propylene sulfide) was used, dilaurylthiodipropionate (LTDP) was substituted for the poly (propylene sulfide), or twice the amount of poly(propylene sulfide) or NP-A-RP was used as the sole stabilizer. Details of each composition and the results of the embrittlement test are tabulated below in Table I.

PTA) with the polypropylene of Examples 1–15 and the compositions compression molded into 10 mil sheets using a cycle of 215° C./5 minutes. Strips cut from these sheets were evaluated, as above, for embrittlement after extraction in boiling distilled water for 3 days. Details of these compositions and results of the embrittlement tests, as compared with controls which contained no poly(propylene sulfide) or no PTA, or contained twice the amount of poly(propylene sulfide) or PTA as sole stabilizer, are set forth in Table II below. The poly(propylene sulfide) used in Examples 16 and 19 and having an RSV of 0.1 was prepared by cleaving the poly(propylene sulfied) having an RSV of 3.4 in the following manner. Twenty-five parts of this poly(proplene sulfide) was dissolved in 1100 parts of anhydrous benzene under nitrogen. Then while stirring at 30° C., 4.8 parts of lithium butyl in 30 parts of n-hexane was added. After stirring for 2.2 hours at 30 to 25° C., the reaction was stopped by adding 10 parts of anhydrous ethanol. After 5 minutes, 625 ml. of a 10% aqueous solution of hydrogen chloride was added, and the temperature was raised to 60° C. and held there for 1.5 hours. The mixture was then cooled and washed neutral with water, filtered, evaporated, and the product dried for 16 hours at 80° C. under vacuum to yield a viscous liquid.

TABLE II

| | Composition [1] | | | | | | | | | |
|---|---|---|---|---|---|---|---|---|---|---|
| | 16 | 17 | 18 | 19 | 20 | 21 | 22 | 23 | 24 | 25 |
| Poly(propylene sulfide): | | | | | | | | | | |
| RSV 0.1 | .5 | | | .5 | | | | | | |
| RSV 3.4 | | .5 | | | .5 | | .5 | | 1.0 | |
| RSV 5.0 | | | .5 | | | .5 | | .5 | | |
| PTA | .5 | .5 | .5 | | | | | | 1.0 | |
| Embrittlement time (days) | 15 | 31 | 40 | 1–5 | 1–5 | 1–5 | .5 26 | 1–5 | 1–5 | 1.0 28 |

[1] Parts per 100 parts polypropylene.

Example 26

The procedure of Examples 16–25 was repeated using 0.5 part of a poly(propylene sulfide) having an RSV of 5.0 and 0.5 part of the reaction product of 1 mole of crotonaldehyde and 3 moles of 3-methyl-6-tert-butylphenol (also referred to as BC-C-RP). After 3 days' extraction in boiling distilled water, the sample gave an embrittlement test result of 10 days whereas controls containing only the phenolic antioxidant BC-C-RP or the poly-propylene sulfide) gave a value of 1 day each.

Examples 27–31

The procedure of Examples 16–25 was repeated except that 0.5 part of the polymer of an episulfide of a 1-olefin containing 16 to 18 carbons, the polymer having an RSV of 2.2 or poly(cis-2-butene episulfide) having an

TABLE I

| | Composition (parts per 100 parts polypropylene) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Poly(propylene sulfide): | | | | | | | | | | | | | | | |
| RSV: 0.12 | .5 | | | | | .5 | | | | | | | | | |
| 0.64 | | .5 | | | | | .5 | | | | | | | | |
| 1.5 | | | .5 | | | | | .5 | | | | | 1.0 | | |
| 5.0 | | | | .5 | | | | | .5 | | | | | 1.0 | |
| NP-A-RP | .5 | .5 | .5 | .5 | | | | | | | .5 | 1.0 | | | 1.0 |
| LTDP | | | | | .5 | | | | | .5 | | | | | |
| Embrittlement time (days) | 2 | 4 | 21 | 24 | 2 | 1–5 | 1–5 | 1–5 | 1–5 | 1 | 1 | 1 | 1–5 | 1–5 | 1–5 |

Examples 16–25

Compositions were prepared in accordance with the procedure of Examples 1–15 by blending 0.5 part of various poly(propylene sulfide)s having an RSV of 0.1, 3.4, or 5.0 with 0.5 part of 4,6-di(4-hydroxy-3,5-di-tert-butylphenoxy)-2-S-decyl-1,3,5-triazine (also referred to as RSV of 2.6, was substituted for the poly(propylene sulfied) and 0.5 part of either PTA or BC-C-RP was used as the phenolic antioxidant. Details of these compositions and results of the embrittlement test as compared with controls which contained no polymer of the episulfide are set forth in Table III below.

TABLE III

| | Composition¹ | | | | |
|---|---|---|---|---|---|
| | 27 | 28 | 29 | 30 | 31 |
| Poly(C₁₆₋₁₈ episulfide) | 0.5 | 0.5 | 0.5 | | |
| Poly(cis-2-butene episulfide) | | | | 0.5 | 0.5 |
| PTA | 0.5 | | | 0.5 | |
| BC-C-RP | | 0.5 | | | |
| Embrittlement time (days) | 43 | 9 | 1 | 35 | 2 |

¹ Parts per 100 parts polypropylene.

What I claim and desire to secure by Letters Patent is:

1. A high molecular weight, crystalline, stereoregular polymer of an α-monoolefin having at least 3 carbon atoms containing as a stabilizer therefor stabilizing amounts of a polymer of an episulfide of the formula

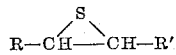

where R is an alkyl radical containing 1 to 28 carbon atoms and R' is selected from the group consisting of hydrogen and methyl, said polymer of an episulfide having an RSV greater than about 0.8 as measured on a 0.1% solution in chloroform at 25° C., and a phenolic antioxidant selected from the group consisting of 2,4,6-trialkyl phenols, 2-aralkyl-4,6-dialkyl phenols, mono(dialkylhydroxybenzyl) phenols, di(dialkylhydroxybenzyl) phenols, tri(dialkylhydroxybenzyl) phenols, poly(alkylphenol) substituted hydrocarbons, hydroxyphenyl polyalkyl chromans, adducts of an alkylphenol and a cyclic terpene, thiobis (alkylphenol)s, and hydroxyphenoxy substituted triazines.

2. The composition of claim 1 in which the polymer is polypropylene.
3. The composition of claim 2 in which the polymer of an episulfide is poly(propylene sulfide).
4. The composition of claim 2 in which the polymer of an episulfide is the polymer of an episulfide of a C₁₆–C₁₈ 1-monoolefin mixture.
5. The composition of claim 2 in which the polymer of an episulfide is poly(cis-2-butene episulfide).

References Cited

UNITED STATES PATENTS

| | | | |
|---|---|---|---|
| 2,962,457 | 11/1960 | Mackinny | 260—3 |
| 2,965,651 | 12/1960 | Kosmin | 260—45.8 |
| 2,985,617 | 5/1961 | Salyer et al. | 260—45.75 |
| 3,000,865 | 9/1961 | Gurgiolo | 260—79 |
| 3,174,946 | 3/1965 | Van Schooten | 260—45.95 |
| 3,188,324 | 6/1965 | Patinkin et al. | 260—45.8 |
| 3,190,852 | 6/1965 | Doyle | 260—45.8 |
| 3,222,326 | 12/1965 | Brodoway | 260—79.7 |
| 3,234,236 | 2/1966 | Sander et al. | 260—45.8 |
| 3,258,449 | 6/1966 | Heuck et al. | 260—45.95 |
| 3,259,604 | 7/1966 | Hawkins | 260—45.95 |
| 3,294,736 | 12/1966 | Jacob | 260—45.95 |

FOREIGN PATENTS 1,048,022  12/1958  Germany.

SAMUEL H. BLECH, *Primary Examiner.*

MURRAY TILLMAN, *Examiner.*

T. G. FIELD, JR., *Assistant Examiner.*